3,161,627
FOUR-COMPONENT TRANSITION METAL CATALYST FOR POLYMERIZING OLEFINS
Harry W. Coover, Jr., and Frederick B. Joyner, Kingsport, Tenn., assignors to Eastman Kodak Company, Rochester, N.Y., a corporation of New Jersey
No Drawing. Filed Jan. 12, 1961, Ser. No. 82,147
9 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpected catalytic activity, and which gives products characterized by unusually high crystallinity, softening point, thermal stability, stiffness and being substantially free of non-crystalline polymers.

This application is a continuation-in-part of copending application Serial No. 724,914, filed March 31, 1958, now Patent No. 2,969,346.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

In the copending application of Young, Hargis and Reynolds, Serial No. 724,903, filed March 31, 1958, now Patent No. 3,004,020, there is described a catalyst for the polymerization of α-monoolefins. This catalyst composition contains a transition metal, a second metal which is either aluminum, zinc or magnesium and a halogen. The catalyst described by Young et al. is quite effective for polymerizing ethylene to form high molecular weight, highly crystalline products. However, when this catalyst composition is used to polymerize propylene and higher molecular weight α-monoolefins, the product contains primarily excessive amounts of relatively low molecular weight polymers which are oils, greases and rubbers. It is one of the objects of this invention to provide a novel process for polymerizing propylene and higher α-olefins wherein the amount of relatively low molecular weight product formed is substantially reduced and the amount of solid crystalline polymer is greatly increased.

When a solid polyolefin of high density and high crystallinity is desired, a catalyst mixture that produces large quantities of oils and rubbers is undesirable and in some instances commercially inadequate.

This invention is concerned with and has for an object the provision of improved processes whereby α-monoolefins and particularly propylene can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a transition metal selected from the group consisting of titanium, zirconium, vanadium, chromium and molybdenum, a second metal selected from the group consisting of aluminum, zinc and magnesium, a halogen selected from the group consisting of chlorine, bromine and iodine, and a fourth component selected from the group consisting of esters, amides, and ester-amides having the formulas: $P(O)Y_3$, $PY_3$ and $YC(O)(CH_2)_nC(O)Y$ wherein each Y is an alkylamino ($-NR_2$) or alkoxy ($-OR$), said R being an alkyl radical containing 1 to 8, preferably 1 to 4, carbon atoms, and wherein $n$ is an integer of 1 to 4. The catalytic activity of this mixture was wholly unexpected, particularly since the above mixture in the absence of the fourth component produces large amounts of oils and rubbers in polymerizing propylene and higher monoolefins. The inventive process is carried out in liquid phase in an inert organic liquid and preferably an inert liquid hydrocarbon vehicle, but the process can be carried out in the absence of inert diluent. The process proceeds with excellent results over a temperature range of from 0° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert reaction medium.

The invention is of particular importance in the preparation of highly crystalline polypropylene, the polybutenes and polystyrene although it can be used for polymerizing a mixture of ethylene and propylene as well as other α-monoolefins containing up to 10 carbon atoms. The polypropylene produced has a softening point above 155° C. and a density of 0.91 and higher. Usually, the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above, the improved results obtained in accordance with this invention depend upon the particular catalyst combination. Thus, one of the components of the catalyst is a transition metal selected from the group consisting of titanium, zirconium, vanadium, chromium and molybdenum. The second metal in the catalyst is selected from the group consisting of aluminum, zinc and magnesium and the halogen is selected from the group consisting of chlorine, bromine and iodine. If desired, the halogen can be in the form of an interhalogen such as iodine monochloride, iodine monobromide and the like, and the term halogen is intended to include interhalogens. These components of the catalyst mixture can be mixed in any desired manner. For example, the metals can be admixed and the halogen then added to the mixture usually in an inert atmosphere, such as under nitrogen. However, the mixing can be done in an atmosphere of the monomer to be polymerized. It is preferred to add the metals to a solvent that is used as the reaction vehicle, and the halogen is then introduced to the resulting mixture. In some instances it is desirable to heat a mixture of the above catalyst components at a temperature of at least 50° C. to obtain the desired reaction. The fourth component of the catalyst composition is an ester, an amide or an ester-amide having the formula: $P(O)Y_3$, $PY_3$, $RC(O)Y$ and $YC(O)(CH_2)_nC(O)Y$. Each Y represents a lower alkylamino or lower alkoxy radical, R is an alkyl radical containing 1 to 8, preferably 1 to 4, carbon atoms and $n$ is an integer of 1 to 4.

The fourth component of the catalyst can be selected from esters of carboxylic acids, lactones (intramolecular esters of carboxylic acids) and organic carbonates having the structural formulas:

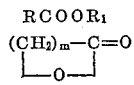

and

wherein R is selected from the group consisting of hydrogen, alkyl radicals containing 1 to 12 carbon atoms, phenyl, $-(CH_2)_nCOOR_2$ wherein $n$ is a number from 0 to 4, and

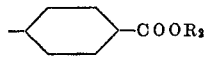

$R_2$ being an alkyl radical containing 1 to 4 carbon atoms and $m$ being an integer of 1 to 4, and wherein $R_1$ is selected from the group consisting of alkyl radicals containing 1 to 4 carbon atoms, phenyl, cyclohexyl, tetrahydrofuryl, β-acetoxyethyl and phenylalkyl wherein the alkyl radical contains 1 to 4 carbon atoms.

Among the specific compounds that can be used are ethyl acetate, methyl carbonate, butyl propionate, benzyl acetate, cyclohexyl formate, γ-valerolactone, butyl oxalate, methyl succinate, isopropyl phthalate, ethylene glycol diacetate, isobutyl phenylacetate, sec-butyl formate, ethyl n-caproate, butyl benzoate, ethyl laurate, tetrahydrofuryl acetate, ethyl pelargonate, and the like.

Specific catalyst mixtures that can be used in the practice of our invention are:

(a) Aluminum, titanium, iodine monochloride and ethyl acetate;
(b) Zinc, vanadium, chlorine and methyl carbonate;
(c) Magnesium, molybdenum, bromine and butyl propionate;
(d) Aluminum, vanadium, iodine and benzyl acetate;
(e) Zinc, vanadium, chlorine and cyclohexyl formate;
(f) Magnesium, zirconium, bromine and γ-valerolactone;
(g) Zinc, chromium, chlorine and butyl oxalate;
(h) Magnesium, zirconium, bromine and methyl succinate;
(i) Aluminum, titanium, iodine monochloride and isopropyl phthalate;
(j) Aluminum, titanium, chlorine and ethylene glycol diacetate;
(k) Aluminum, titanium, chlorine and isobutyl phenylacetate;
(l) Aluminum, vanadium, iodine monochloride and sec-butyl formate;
(m) Aluminum, titanium, iodine monochloride and ethyl n-caproate;
(n) Aluminum, titanium, iodine monochloride and butyl benzoate;
(o) Aluminum, titanium, iodine monochloride and ethyl laurate;
(p) Aluminum, titanium, iodine monochloride and tetrahydrofurfuryl acetate;
(q) Aluminum, titanium, iodine monochloride and ethyl pelargonate.

The limiting factor in the temperature of the process appears to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C. and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

Preferably from 0.1 to 10 atoms of second metal per atom of transition metal, from 0.1 to 10 atoms of second metal per mole of halogen, and from 0.1 to 0.5 moles of fourth component per mole of halogen are used, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well-known inert liquid hydrocarbons. The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with a polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene, styrene and other α-monoolefins in accordance with this invention is a mixture of aluminum, titanium, iodine monochloride and ethyl laurate. The importance of the various components of this reaction mixture is evident from the fact that in the absence of the fourth component large amounts of oils and rubbers are produced in a propylene polymerization. However, when ethyl laurate or other fourth component within the scope of the invention is added to the mixture the resulting catalyst composition is highly effective for polymerizing propylene to form a highly crystalline, high density, high softening polymer.

The invention is illustrated by the following examples of certain preferred embodiments thereof.

*Example 1*

In a nitrogen-filled dry box, a total of 2 g. of catalyst was added to a 500-ml. pressure bottle containing 100 ml. of dry heptane. The catalyst was made up of 1.5 g. of Al–Ti–iodine monochloride activated catalyst prepared by mixing aluminum (0.6 g.), titanium (1.0 g.) and, after covering the mixture with n-heptane, iodine monochloride, and 0.5 g. ethyl acetate. The pressure bottle was then attached to a source of propylene, and the reaction mixture was agitated, heated to 75° C. and maintained under 30 p.s.i. propylene pressure for 6 hours. At the end of this time, the bottle was removed from the propylene source, dry isobutyl alcohol was added to deactivate the catalyst, and then the polymer was washed with hot, dry isobutanol to remove the catalyst residues. The yield of highly crystalline polypropylene was 10.1 g. This polymer had an inherent viscosity in tetralin at 145° C. of 1.88 and a density of 0.911.

When a control run was made using only the Al–Ti–iodine monochloride activated catalyst, omitting the ethyl acetate, little or no crystalline polypropylene was formed under these conditions.

*Example 2*

Inside a nitrogen-filled dry box, a 285-ml. stainless steel autoclave was loaded with 2 g. of catalyst comprising a combination of 0.3 g. sec-butyl formate and an Al–Ti–chlorine catalyst and 100 ml. of dry mineral spirits (B.P. 197° C.). The autoclave was sealed, placed in a rocker, and 100 ml. (51 g.) of dry, liquid propylene was added. Rocking was initiated, and the mixture was heated to 85° C. and maintained at this temperature for 6 hours. The polymer was worked up as described in Example 1 to give a yield of 27 g. of highly crystalline polypropylene having an inherent viscosity of 2.1 in tetralin at 145° C. When hydrogen was admitted to the polymerization vessel and was maintained there at 50 p.s.i. partial pressure, the inherent viscosity of the product was 1.65. An increase in the hydrogen pressure to 500 p.s.i. in a similar experiment produced a very low molecular weight crystalline polypropylene of inherent viscosity 0.29.

*Example 3*

The procedure of Example 2 was used to polymerize propylene with no mineral spirits added. One hundred grams of liquid propylene monomer was used and within the 6-hour reaction period at 85° C. a 68 g. yield of highly crystalline polypropylene of inherent viscosity 1.95 was obtained.

*Example 4*

The procedure of Example 1 was employed to polymerize a 50 g. charge of 3-methyl-1-butene using 3 g. of catalyst of which 1 g. was butyl propionate. The yield was 29.5 g. of highly crystalline poly(3-methyl-1-butene). This polymer in the form of an oriented fiber gave a crystalline melting point of 308–310° C.

*Example 5*

The procedure of Example 2 was used to polymerize a 50 g. charge of styrene using 0.75 g. of catalyst of which 0.15 g. was ethyl n-caproate. A 22.2 g. yield of crystalline polystyrene was obtained. This polymer had an inherent viscosity of 2.00 and a crystalline melting point (powder) of 220–237° C.

*Example 6*

In a nitrogen-filled dry box, a 7-oz. tapered pressure bottle was charged in order with 40 ml. of dry benzene, 20 g. of 4-methyl-1-pentene and 1 g. of an Al–Ti–chlorine catalyst and 0.25 g. of methyl succinate. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 12.5 g. and melted at 200–205° C. (powder). Allylbenzene, vinylcyclohexane, butadiene, isoprene, and 3-phenyl-1-butene were readily polymerized by this procedure to give solid polymers.

*Example 7*

The procedure of Example 2 was followed except that the catalyst charge was a mixture of 0.3 g. of an Al–Ti–chlorine catalyst and 0.2 g. of ethyl laurate. No additional solvent was employed and the polymerization temperature was 85° C. The crystalline polypropylene obtained had a density of 0.918 and an inherent viscosity of 1.75. Other esters which can be used in place of ethyl laurate to give similar results include methyl carbonate, benzyl acetate, γ-valerolactone, butyl oxalate, cyclohexyl formate, butyl benzoate, tetrahydrofurfuryl acetate, isopropyl phthalate, ethylene glycol diacetate, ethyl pelargonate and isobutyl phenyl-acetate.

Thus, by means of this invention polyolefins, such as polypropylene, are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst not suggested in prior art polymerization procedures is employed. As a result of the use of this novel catalyst, it is possible to produce polymeric hydrocarbons, particularly polypropylene, having properties not heretofore obtainable. For example, polypropylene prepared in the presence of catalyst combination within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:
1. In the polymerization of α-monoolefinic hydrocarbon containing at least three carbon atoms to form solid crystalline polymer, the improvement which comprises catalyzing the polymerization with a catalytic mixture consisting essentially of a transition metal selected from the group consisting of titanium, zirconium, vanadium, chromium and molybdenum, a second metal selected from the group consisting of aluminum, zinc and magnesium, a halogen selected from the group consisting of chlorine, bromine and iodine and an ester having the formula $RCOOR_1$ wherein R has the formula

$$-(CH_2)_nCOOR_2$$

wherein $n$ is a number from 0 to 4 and $R_1$ and $R_2$ are alkyl radicals containing 1 to 4 carbon atoms, the molar ratio of halogen to ester being within the range of 0.1 to 0.5.

2. In the polymerization of propylene to form solid crystalline polymer the improvement which comprises catalyzing the polymerization with a catalytic mixture consisting essentially of a transition metal selected from the group consisting of titanium, zirconium, vanadium, chromium and molybdenum, a second metal selected from the group consisting of aluminum, zinc and magnesium, a halogen selected from the group consisting of chlorine, bromine and iodine and an ester having the formula $RCOOR_1$ wherein R has the formula $-(CH_2)_nCOOR_2$ wherein $n$ is a number from 0 to 4 and $R_1$ and $R_2$ are alkyl radicals containing 1 to 4 carbon atoms, the molar ratio of halogen to ester being within the range of 0.1 to 0.5.

3. In the polymerization of propylene to form solid crystalline polymer the improvement which comprises effecting the polymerization in the presence of a catalytic mixture consisting essentially of aluminum, titanium, chlorine and ethylene glycol diacetate, the molar ratio of chlorine to ethylene glycol diacetate being within the range of 0.1 to 0.5.

4. The method according to claim 3 wherein vanadium is used in the catalyst mixture in place of titanium.

5. The method according to claim 3 wherein zinc is used in the catalyst mixture in place of aluminum.

6. As a composition of matter a catalytic mixture consisting essentially of a transition metal selected from the group consisting of titanium, zirconium, vanadium, chromium and molybdenum, a second metal selected from the group consisting of aluminum, zinc and magnesium, a halogen selected from the group consisting of chlorine, bromine and iodine and an ester having the formula $RCOOR_1$ wherein R has the formula $$-(CH_2)_nCOOR_2$$

wherein $n$ is a number from 0 to 4 and $R_1$ and $R_2$ are alkyl radicals containing 1 to 4 carbon atoms, the molar ratio of halogen to ester being within the range of 0.1 to 0.5.

7. As a composition of matter a catalytic mixture of aluminum, titanium, chlorine and ethylene glycol diacetate the molar ratio of chlorine to ethylene glycol diacetate being within the range of 0.1 to 0.5.

8. A composition according to claim 7 wherein vanadium is used in the catalyst mixture in place of titanium.

9. A composition according to claim 7 wherein zinc is used in the catalyst mixture in place of aluminum.

References Cited in the file of this patent
UNITED STATES PATENTS 2,965,627    Field et al. _____ Dec. 20, 1960
3,004,020    Young et al. _____ Oct. 10, 1961